(12) United States Patent
Park (10) Patent No.: US 12,277,104 B2
(45) Date of Patent: Apr. 15, 2025

(54) METHOD FOR VISUALIZING AND MANAGING ASSET CHANGES BEFORE REFLECTING TO CLOUD, AND APPARATUS SUPPORTING THE SAME

(71) Applicant: TATUM Inc., Seoul (KR)

(72) Inventor: Su Hyun Park, Seoul (KR)

(73) Assignee: TATUM Inc., Seoul (KR)

( * ) Notice: Subject to any disclaimer, the term of this patent is extended or adjusted under 35 U.S.C. 154(b) by 0 days.

(21) Appl. No.: 18/049,054

(22) Filed: Oct. 24, 2022

(65) Prior Publication Data

US 2023/0133945 A1 May 4, 2023

(30) Foreign Application Priority Data

Nov. 2, 2021 (KR) .......................... 10-2021-0148938

(51) Int. Cl.
*G06F 16/23* (2019.01)
(52) U.S. Cl.
CPC ...... *G06F 16/2358* (2019.01); *G06F 16/2315* (2019.01); *G06F 16/235* (2019.01); *G06F 16/2365* (2019.01)

(58) Field of Classification Search
CPC . G06F 16/2358; G06F 16/2315; G06F 16/235
See application file for complete search history.

(56) References Cited

U.S. PATENT DOCUMENTS

| 9,350,561 | B1* | 5/2016 | Schafer | G06Q 10/06 |
| 2012/0131591 | A1* | 5/2012 | Moorthi | G06F 9/5061 718/104 |
| 2020/0012480 | A1* | 1/2020 | Rizo | G06F 21/577 |
| 2022/0052910 | A1* | 2/2022 | Neelakantam | G06F 3/067 |
| 2023/0071047 | A1* | 3/2023 | Carames | G06F 9/5005 |

(Continued)

FOREIGN PATENT DOCUMENTS

KR  10-2021-0041295 A  4/2021

OTHER PUBLICATIONS

Salonen, Esko. "Software Project Services using Infrastructure-as-Code." (2020) (Year: 2020).*

(Continued)

*Primary Examiner* — Mohsen Almani
(74) *Attorney, Agent, or Firm* — Studebaker Brackett PLLC (57) ABSTRACT

The present disclosure relates to a method of authorizing a change in cloud infrastructure performed by an apparatus, including the operations of: changing the assets requested by a development team or a management team using infrastructure as code (IaC); hooking and holding changes of assets; collecting cloud infrastructure information from a cloud environment through an application programming interface (API); visualizing the cloud infrastructure information; visualizing the asset changes; reporting the visualized cloud infrastructure information and the visualized asset changes to a manager via an authorization process; returning or approving the asset changes in the authorization process by the manager; and storing the information of the assets requested by the development team or the management team and the information of the authorization process in a database.

1 Claim, 6 Drawing Sheets

(56) References Cited

U.S. PATENT DOCUMENTS

2023/0117893 A1* 4/2023 Durvasula .............. G06N 20/00
 706/12

OTHER PUBLICATIONS

Lepiller, Julien, et al. "Analyzing infrastructure as code to prevent intra-update sniping vulnerabilities." Tools and Algorithms for the Construction and Analysis of Systems: 27th International Conference, TACAS Mar. 27-Apr. 1, 2021 (Year: 2021).*
Boda, Vishnu Vardhan Reddy, and Hitesh Allam. "Crossing Over: How Infrastructure as Code Bridges FinTech and Healthcare." Innovative Computer Sciences Journal 6.1 (2020). (Year: 2020).*

* cited by examiner

METHOD FOR VISUALIZING AND MANAGING ASSET CHANGES BEFORE REFLECTING TO CLOUD, AND APPARATUS SUPPORTING THE SAME

CROSS-REFERENCE TO RELATED APPLICATION

A claim for priority under 35 U.S.C. § 119 is made to Korean Patent Application No. 10-2021-0148938 filed on Nov. 2, 2021 in the Korean Intellectual Property Office, the entire contents of which are hereby incorporated by reference.

BACKGROUND

1. Technical Field

The present disclosure relates to a method for visualizing and managing asset changes before reflecting the changes in the cloud, and more particularly, to a method of hooking and reserving asset changes before reflecting the changes in the cloud, and visualizing the asset changes to provide the visualized asset changes to a manager.

2. Description of Related Art

In an existing on premises environment, in order to change infrastructure for computing or network equipment, a process in which a development team or a management team requests a change of the infrastructure, changed matters are approved by an approval and authorization process of an IT infrastructure team and a security team, and then, the changed matters are reflected is carried out.

The cloud environment is formed not by physical assets purchased and installed but by various settings in a virtual space. It is difficult for an IT infrastructure team or a security team to accurately understand and reflect changes or requests since the IT infrastructure team or the security team may lack insight into cloud architecture and resource composition as much as the development team. So, occasionally, a review is undertaken in such a manner that the changes are reflected in advance and are approved later.

Therefore, there is a need to develop an apparatus capable of reflecting changes in assets suitable for the cloud environment.

SUMMARY

In a process in which a development team or a management team requests a change of infrastructure, changed matters are approved by an approval and authorization process of an IT infrastructure team and a security team, and then, the changed matters may not be suitable for the cloud environment. Moreover, such a process reduces agility which is a merit of the cloud environment.

Therefore, the present disclosure has been made to solve the above-mentioned problems occurring in the prior art, and in an aspect of the present disclosure, an object of the present disclosure is to provide an authorization process capable of visualizing an authorization process with respect to changes of cloud resources and a firewall change before distribution and confirming and reflecting contents of asset changes in advance.

The aspects of the present disclosure are not limited to those mentioned above, and other aspects not mentioned herein will be clearly understood by those skilled in the art from the following description.

To accomplish the above-mentioned objects, according to an aspect of the present disclosure, there is provided a method of authorizing a change in cloud infrastructure performed by an apparatus, including the operations of: changing the assets requested by a development team or a management team using infrastructure as code (IaC); hooking and holding changes of assets; collecting cloud infrastructure information from a cloud environment through an application programming interface (API); visualizing the cloud infrastructure information; visualizing the asset changes; reporting the visualized cloud infrastructure information and the visualized asset changes to a manager via an authorization process; returning or approving the asset changes in the authorization process by the manager; and storing the information of the assets requested by the development team or the management team and the information of the authorization process in a database.

Moreover, the method further includes the operation of applying the holding asset changes to the cloud environment in a case in which the manager approves the asset changes in the authorization process.

Furthermore, the method further includes the operation of constructing an algorithm calculating the cases in which the changes are approved or returned in the process by performing machine learning of the asset changes requested by the development team or the management team.

Additionally, the authorization process includes a plurality of operations, and the method further includes the operation of progressing the authorization process while going through approval by the persons in charge of the corresponding operations.

In addition, the method further includes the operation of, in a case in which the changes are returned in any one among the plurality of operations, transmitting the information about the returned operation and the information about the returned asset changes to the person who requested the corresponding change, without progressing to the next operation.

Moreover, the method further includes the operation of, in a case in which the person in charge of the corresponding operation returns the changes in the process, transmitting the reason of return to the person who requested the changes without applying the holding changes to the cloud environment.

Furthermore, the asset changes include contents related to an infrastructure change, an account change, and a firewall change.

Additionally, the method further includes the operation of: applying the asset changes to the cloud environment without holding in a case in which it is impossible to hook the asset changes; visualizing the applied asset changes; reporting the visualized cloud infrastructure information and the visualized asset changes to the manager through the authorization process; modifying the changes applied to the cloud environment in a case in which the manager returns the asset changes in the authorization process; and visualizing the modified contents.

In another aspect of the present invention, there is provided an apparatus performing authorization with respect to a cloud infrastructure change, including: an input/output module; a database storing data; and one or more processors connected to the database, wherein the processor changes assets requested by a development team or a management team using infrastructure as code (IaC), hooks and holds changes of the changed assets, and collects cloud infrastructure information from the cloud environment through application programming interface (API). The display module visualizes the cloud infrastructure information and outputs through the display module, and visualizes the asset changes and outputs through the display module. The input/output module outputs the visualized cloud infrastructure information and the visualized asset changes reported to a manager through an authorization process, and inputs return or approval of the asset changes that the manager determined in the authorization process. The database stores information about the assets requested by the development team or the management team and information about the authorization process in the database.

In another aspect of the present invention, there is provided an apparatus performing authorization with respect to a cloud infrastructure change, including: a display module; a database storing data; and one or more processors connected to the database, wherein the processor changes assets requested by a development team or a management team using infrastructure as code (IaC), hooks and holds changes of the assets, collects cloud infrastructure information from the cloud environment through application programming interface (API), visualizes the cloud infrastructure information and outputs through the display module, visualizes the asset changes and outputs through the display module, outputs the visualized cloud infrastructure information and the visualized asset changes reported to a manager through an authorization process, inputs return or approval of the asset changes that the manager determined in the authorization process, and stores information about the assets requested by the development team or the management team and information about the authorization process in the database.

In another aspect of the present invention, there is provided a nonvolatile processor-readable medium storing one or more instructions to operate one or more processors, wherein the operation includes: changing the assets requested by a development team or a management team using infrastructure as code (IaC); hooking and holding changes of the assets; collecting cloud infrastructure information from the cloud environment through application programming interface (API); visualizing the cloud infrastructure information; visualizing the asset changes; reporting the visualized cloud infrastructure information and the visualized asset changes to a manager through an authorization process; returning or approving the asset changes by the manager in the authorization process; and storing information about the assets requested by the development team or the management team and information about the authorization process in a database.

Other details of the present disclosure are included in the detailed description and the drawings.

DETAILED DESCRIPTION

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skilled in the art can fully understand the scope of the present disclosure. Therefore, the present disclosure will be defined only by the scope of the appended claims.

Terms used in the specification are used to describe specific embodiments of the present disclosure and are not intended to limit the scope of the present disclosure. In the specification, the terms of a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present disclosure, and the term "and/or" is understood to include a combination of one or more of components described above. It will be understood that terms, such as "first" or "second" may be used in the specification to describe various components but are not restricted to the above terms. The terms may be used to discriminate one component from another component. Therefore, of course, the first component may be named as the second component within the scope of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Terms, such as "below," "beneath," "lower," "above," "upper," and the like, which have spatially relative concepts, may be used to facilitate correlation between one component and other components, as illustrated in the drawings. Such spatially relative terms should be understood as terms including different directions of components during use or operation, in addition to the direction illustrated in the drawings. For example, if the components illustrated in the drawings are turned upside down, the components described as "below" or "beneath" may be placed "above" of other components. Thus, the exemplary term "under" may include all of the directions, "below" and "above". The components may be oriented in other directions, so that the spatially relative terms can be interpreted according to the orientation.

The terms used in the present disclosure are defined as follows.

Infrastructure: This means information technology (IT) infrastructure in the present disclosure. IT infrastructure is a component necessary to operate and manage an IT environment of an enterprise. IT infrastructure may be distributed in a cloud computing system or in internal facilities of an organization. The IT infrastructure includes hardware, software, networking elements, an operating system, and a data storage, and the components are all used to provide IT services and solutions.

Cloud: Cloud is an IT environment abstracting, pooling and sharing expandable resources in a network. The cloud supports cloud computing for executing a work load in the cloud environment.

The cloud consists of a frontend platform, a backend platform, and a delivery network connecting the platforms. The frontend platform may be an end user device, such as a PC, a tablet, a cellular telephone, or the like, or a computer network. The backend platform is a software application accessed via a physical infrastructure or a delivery network (which is generally Internet, but may be an intranet).

The cloud is classified into four types as follows. (1) Private cloud: A private cloud is generally defined as an end user only cloud environment, and is usually in a user's firewall but sometimes on premises. (2) Public cloud: A public cloud is a cloud environment which is created in resources that the end user does not own to be redistributable to another tenant. In detail, the public cloud is a virtual resource pool developed from hardware owned and managed by other supplier, and is automatically provided and assigned among various clients through a self-service interface. (3) Hybrid cloud: A hybrid cloud includes a cloud private cloud and a public cloud, and provides a technology capable of sharing data and application programs between the private cloud and the public cloud. (4) Multi-cloud: A multi-cloud is an IT system including two or more clouds (public cloud or private cloud) regardless of network connection.

Cloud service provider (CSP): Generally, an individual client receives a cloud service from a cloud service provider to operate a cloud. The security manager of the client sets a security setting value for each cloud resource while operating the cloud of the client's enterprise receiving cloud services from the cloud service provider.

API (Application Programming Interface): API is an interface for controlling provided functions by an operating system or a programming language to be used in an application program. The API mainly provides an interface for file control, window control, image processing, character control, and the like.

GUI (Graphical User Interface): GUI shows functions, such as input, output, and the like, in graphics such as icons. The GUI is a computer interface for users to display some functions and purposes in graphic factors, such as objects, frames colors, and the like, on a screen in a case of using a computer.

Infrastructure as Code (IaC): IaC refers to managing and provisioning an infrastructure not through manual processes but through codes.

Hereinafter, preferred embodiments of the present disclosure will be described in detail with reference to the accompanying drawings.

Figure 1:
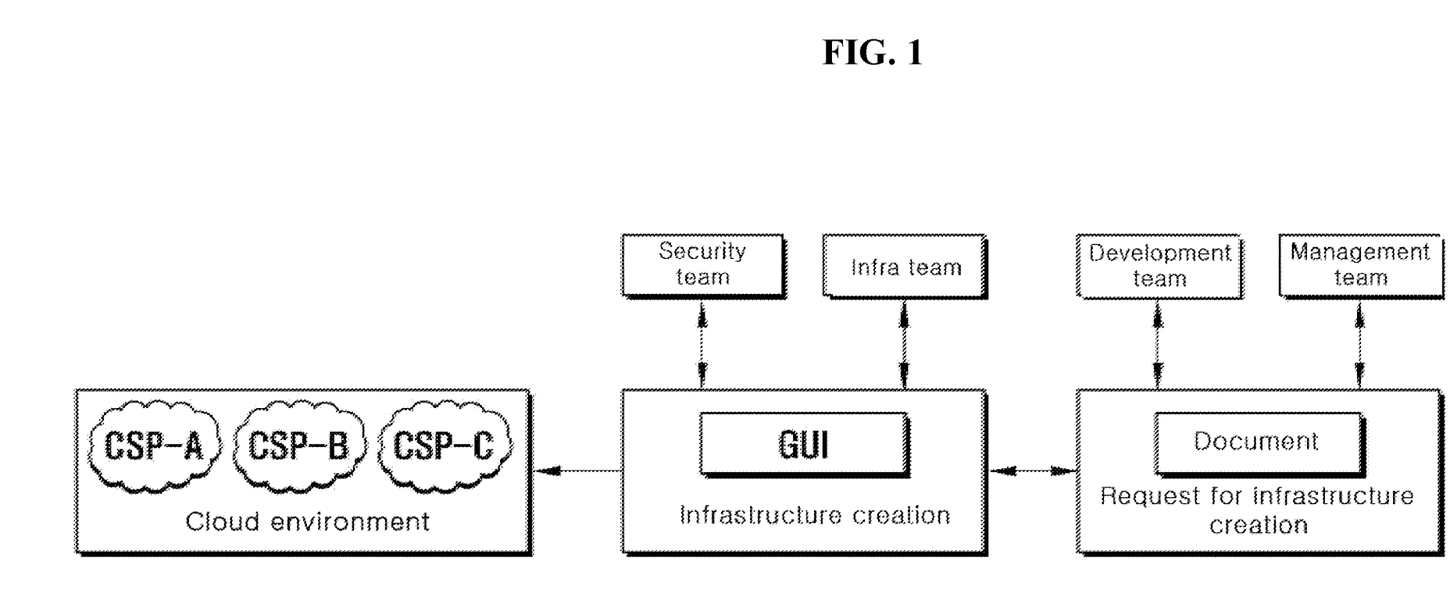
FIG. 1 is a diagram illustrating an example of a conventional infrastructure approving and creating method.

FIG. 1 is a diagram illustrating an example of a conventional infrastructure approving and creating method.

In detail, FIG. 1 illustrates a method of reviewing changes in advance before reflecting infrastructure changes.

In an on-premises environment in which a user directly installs software into a server, in order to change an infrastructure for computing or network equipment, a process in which a development team or a management team requests a change of the infrastructure, changed matters are approved by an approval and authorization process of an IT infrastructure team and a security team, and then, the changed matters are reflected is carried out.

The development team or the management team manages resources (assets) of the cloud infrastructure in codes using infrastructure as code (IaC).

In a case in which the development team or the management team requests creation of a cloud infrastructure, the security team and the infrastructure team generate resources of the requested cloud through a graphical user interface (GUI) environment. Infrastructure creation is approved through the settlement process by a manager of the security team or the infrastructure team.

The changes of the infrastructure formed through the GUI is reflected to the cloud environment.

Figure 2:
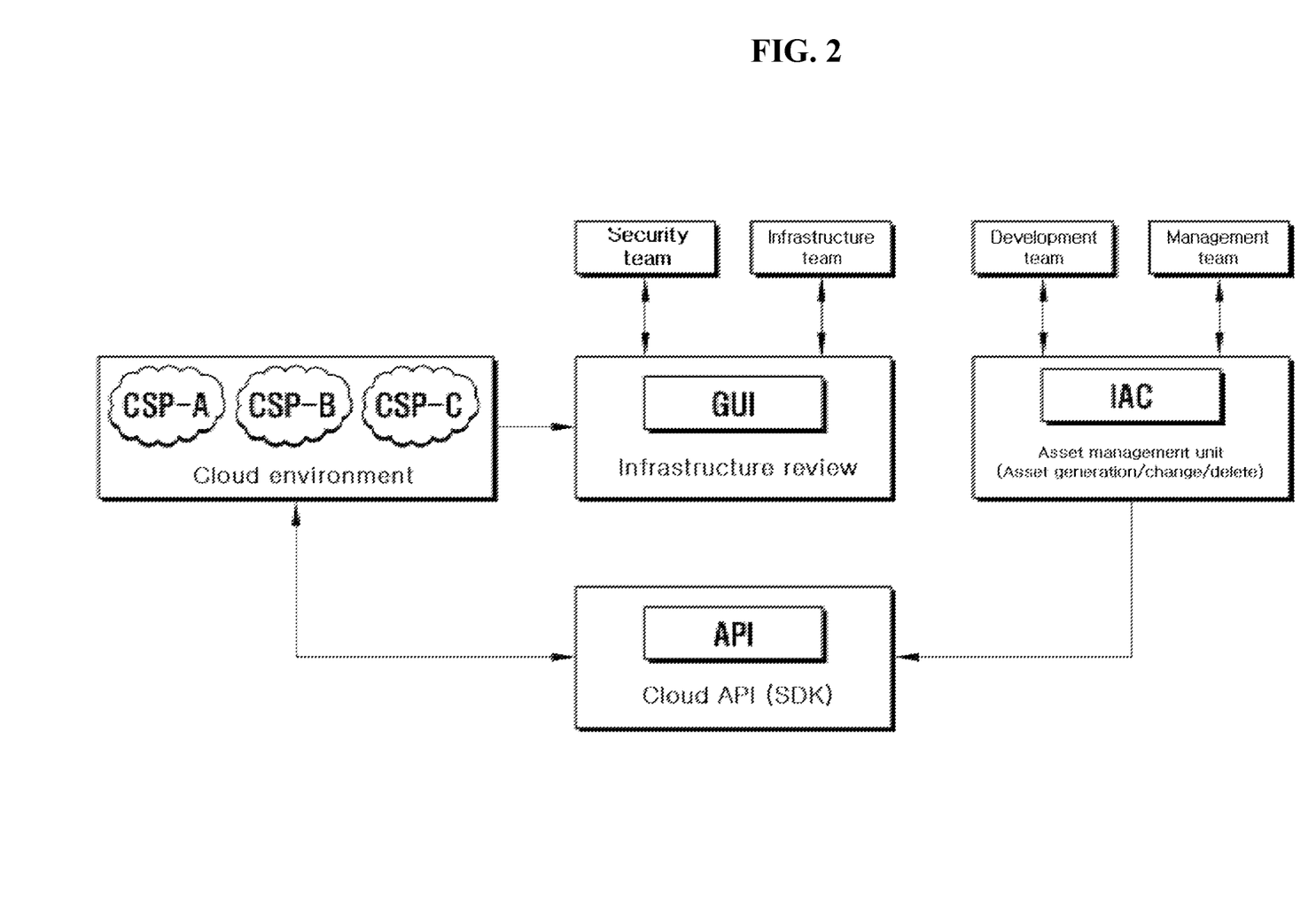
FIG. 2 is a diagram illustrating another example of a conventional infrastructure approving and creating method carried out by companies.

FIG. 2 is a diagram illustrating another example of a conventional infrastructure approving and creating method carried out by companies.

In detail, FIG. 2 illustrates a method of reviewing changes after reflecting infrastructure changes.

A development team or a management team manages and provisions the cloud infrastructure through the IaC. The development team or the management team supports a configuration management by encoding and documenting infrastructure specifications using the IaC in order to change cloud infrastructure assets.

The changed assets are reflected to the cloud environment through the cloud API. In an exemplary embodiment, the development team or the management team supports the changed assets to be easily reflected to the cloud environment using an API software development kit (SDK).

In the system environment of FIG. 2, in contrast with FIG. 1, the asset changes are reflected to the cloud environment in advance before going through an authorization process of a security team or an infrastructure team.

The security team or the infrastructure team reviews the asset changes reflected to the cloud environment through the GUI.

Referring to FIG. 2, it is difficult for the IT infrastructure team or the security team to accurately understand and reflect changes or requests since the IT infrastructure team or the security team do not have insight into cloud architecture and resource composition as much as the development team. Thus, a review is undertaken in such a manner that the changes are reflected in advance and are approved later.

Figure 3:
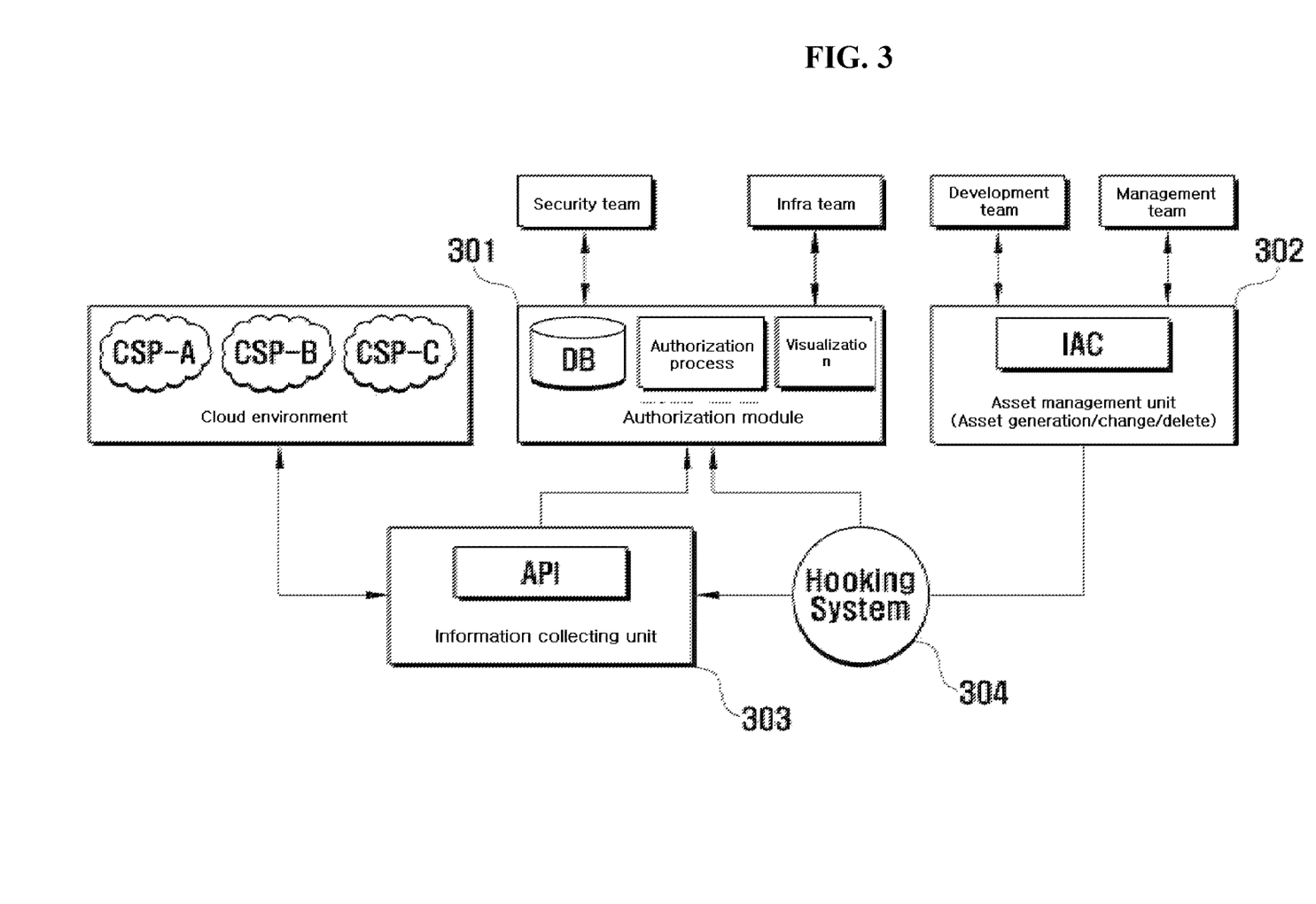
FIG. 3 is a diagram illustrating a cloud infrastructure change, approval and authorization system according to an embodiment of the present disclosure.

FIG. 3 is a diagram illustrating a cloud infrastructure change, approval and authorization system according to an embodiment of the present disclosure.

The development team or the management team requests generation, change, and deletion of cloud infrastructure resources. In an exemplary embodiment, the development team or the management team may request changes of the infrastructure, user accounts, and firewall policies via an asset I 302.

A hooking system 304 holds the requested changes so that the changes stand by distribution of resources before being reflected to the cloud system.

An authorization module 301 visualizes the contents requested by the development team or the management team to visually represent changes to an infrastructure manager (security team, and infrastructure team). The visualized contents may be provided to the manager via the GUI. In order to visually represent the changes, the authorization module 301 visually displays the asset changes using a graph, a diagram, a flow chart, and the like.

In addition, an information collecting unit 303 acquires information about assets from the cloud environment (private cloud or public cloud). The information collecting unit 301 includes an API. In an exemplary embodiment, the information collecting unit 303 gets the existing (before change) cloud infrastructure information through the API to acquire asset information from the cloud.

The existing cloud infrastructure information is also visualized by the authorization module 301 and visually represented to the manager. That is, the contents before and after the change are visualized and provided to the manager, so that the manager can easily understand the changed contents.

The authorization module 301 stores and manages an asset change history executed in the past or the current in a DB. In an exemplary embodiment, the overall authorization process is databased, and contents related to changes, such as how, when, and how the resources were changed, are automatically recorded.

Therefore, it is possible to provide an automated authorization (approval/return) management system with respect to the cloud change history through the above process.

Figure 4:
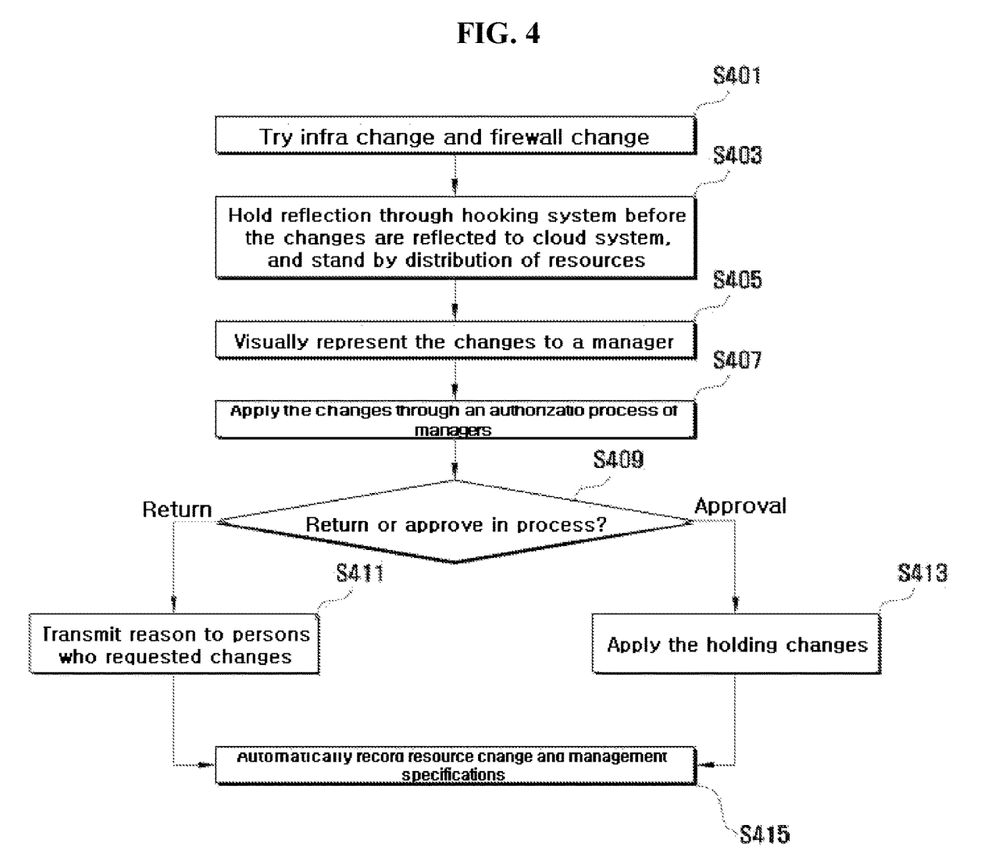
FIG. 4 is a flow chart of a cloud infrastructure change, approval and authorization process according to an embodiment of the present disclosure.

FIG. 4 is a flow chart of a cloud infrastructure change and approval process according to an embodiment of the present disclosure.

The development team or the management team requests and attempts a cloud infrastructure change and a firewall policy change (S401).

Before the changes are reflected to the cloud system, the authorization system holds reflection through the hooking system, and stands by resource distribution (S403).

The authorization system visually represents the changes to the manager (S405). The authorization system also visually represents information about cloud resources before the change to the manager through the information collecting unit. Accordingly, the manager can visually conveniently receive the changed matters and the matters before the change.

The changes go through the authorization (approval/return) process of persons in charge operation by operation (S407). The authorization process includes a plurality of operations, and in this instance, goes through the persons' approval by operations. In a case in which the changes are returned in any one among the plurality of operations, the process does not progress to the next operation, and information on the returned operation and the returned asset change matters are transferred to the person who requested the corresponding changes.

In a case in which the person in charge of the corresponding operation returns the changes in the process, the holding changes are not applied, and the reason of return is transferred to the person who requested the changes (S411).

In a case in which the person in charge of the corresponding operation approves the changes in the process, the holding changes are applied to the cloud (S413). An algorithm calculating an expected effect when resources (assets) or policies changed through the above process is constructed, thereby providing the manager with convenience. The present disclosure performs machine learning the asset changes requested by the development team or the management team and applied to the assets and the cloud environment, and constructs the algorithm calculating the cases in which the changes are approved or returned in the process. Through the machine learning of the cases in which the changes are approved or returned, in a case in which the development team or the management team requests asset changes, the progression speed of the authorization process can be generally reduced.

Specifications of the entire process to reflect the changes are stored in a database, and the contents related to changes, such as how, when, and how the resources were changed, are automatically recorded (S415).

According to the process, the present disclosure hooks the infrastructure changes requested by the development team or the management team to hold the changes not to be reflected actually, thereby increasing agility in the cloud environment by preventing reflection after approval of the changes.

Figure 5:
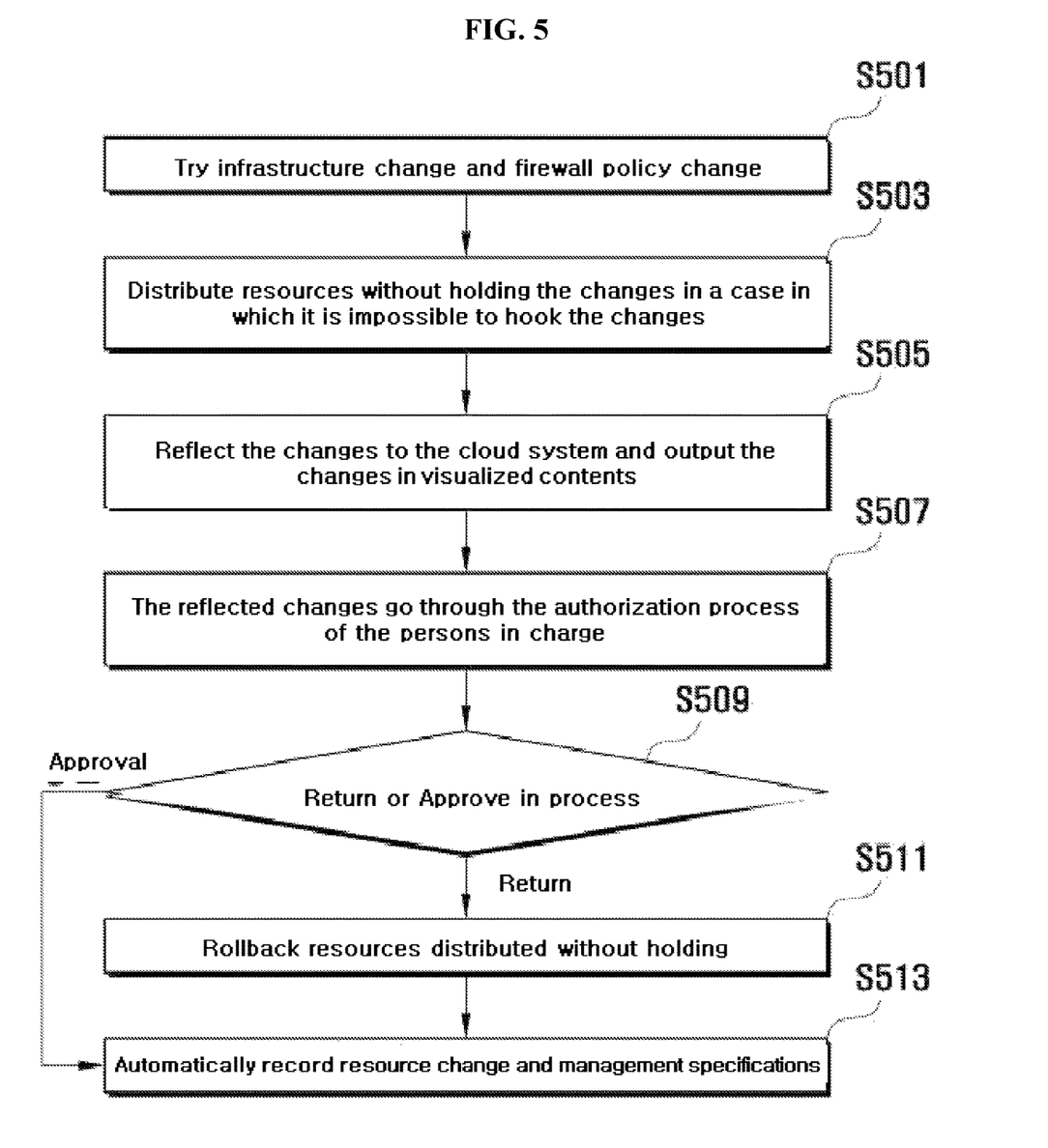
FIG. 5 is a diagram illustrating an output process of a change in cloud infrastructure and the changed matters according to an embodiment of the present disclosure.

FIG. 5 is a diagram illustrating an output process of a change in cloud infrastructure and the changed matters according to an embodiment of the present disclosure.

The development team or the management team requests a cloud infrastructure change and a firewall policy change (S501). The cloud infrastructure change may include generation, change, and deletion of cloud resources.

In a case in which it is impossible to hook through the hooking system before the requested changes are reflected to the cloud system, the changes cannot be in pending. In this case, before approval of the changes by the security team and the IT infrastructure team, the changes are reflected (applied) to the cloud system (S503).

The changes reflected to the cloud system are visually represented to the manager (S505). Information about the changed cloud resources and policies may be also visually represented to the manager through the information collecting unit.

The changed matters go through the authorization process (approval or return) of the persons in charge by operations (S507). The authorization process includes a plurality of operations. In this case, the authorization process progresses while going through approval of the persons in charge of the corresponding operations. In a case in which the changes are returned in any one among the plurality of operations, the process does not progress to the next operation, and information on the returned operation and the returned asset change matters are transferred to the person who requested the corresponding changes.

In a case in which the person in charge of the corresponding operation returns the changes in the process (S509), it is necessary to modify the changes previously reflected to the cloud. Therefore, the cloud infrastructure and the firewall policies are changed, and the visualized contents are also changed and output again (S511).

In this case, the reason of return may be transferred to the person who requested the changes.

In a case in which the person in charge of the corresponding operation approves the changes in the process (S509), the changes previously reflected to the cloud are maintained.

An algorithm calculating an expected effect when resources (assets) or policies changed through the above process is constructed, thereby providing the manager with convenience.

The present disclosure performs machine learning the asset changes requested by the development team or the management team and applied to the assets and the cloud environment, and constructs the algorithm calculating the cases in which the changes are approved or returned in the process. Through the machine learning of the cases in which the changes are approved or returned, in a case in which the development team or the management team requests asset changes, the progression speed of the authorization process can be generally reduced.

The reflected changes and the contents of the entire authorization process are automatically stored in the database (S513).

Figure 6:
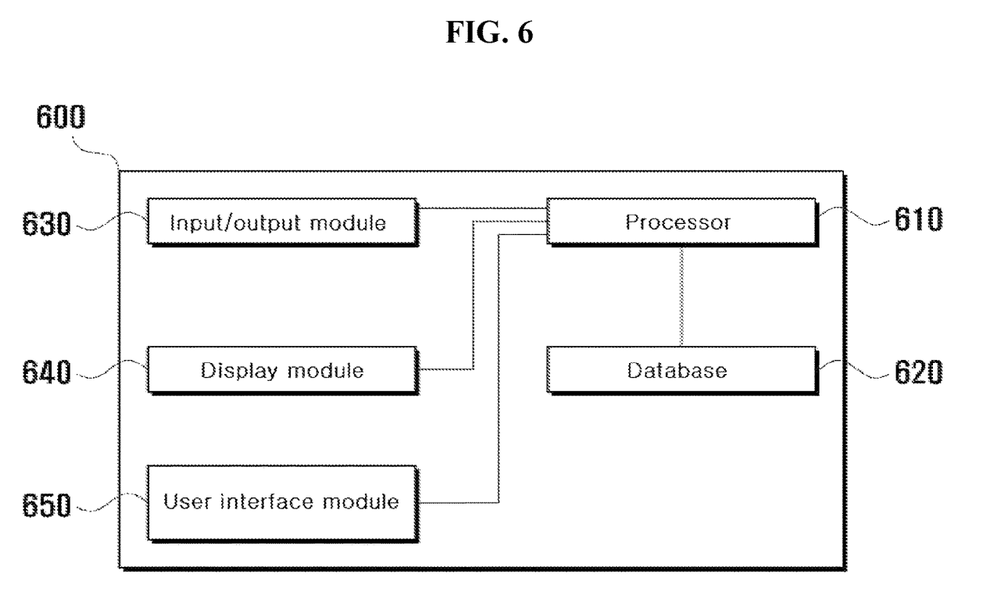
FIG. 6 is a diagram illustrating an example of an apparatus in which the present disclosure is implemented.

FIG. 6 is a diagram illustrating an example of an apparatus in which the present disclosure is implemented.

Referring to FIG. 6, the apparatus 600 includes a processor 610, a database 620, an input/output module 630, a display module 640, and a user interface module 650.

The apparatus 600 is illustrated for convenience of description, and some modules may be omitted. In addition, the apparatus 600 may further include necessary modules. Moreover, some modules in the apparatus 600 may be subdivided modules.

The processor 610 is configured to perform an operation according to an exemplary embodiment of the present disclosure with reference to the drawings. A detailed operation of the processor 610 refers to the contents described with reference to FIGS. 1 to 4.

The database 620 stores various types of information. The database temporarily or semi-permanently stores data. For example, the database may store operating systems (OS) for driving a first device and/or a second device, and data related to applications (e.g., web applications) for creating data for hosting a website. In addition, the database may store modules in the form of computer codes.

For example, the database 620 may include a hard disk drive (HDD), a solid state drive (SSD), a flash memory, a read-only memory (ROM), a random access memory (RAM), and the like. Such a database may be provided as an embedded type or a detachable type.

The input/output module 630 may be any one among various interfaces or connection ports for receiving a user input or outputting information to a user. The input/output module 630 is divided into an input module and an output module, and the input module receives a user input from a user. The user input is implemented in various forms including a key input, a touch input, a voice input, and the like. The input module includes, for example, a keypad, a keyboard, and a mouse of conventional types, a touch sensor for sensing a user's touch, a microphone for receiving voice signals, a camera for recognizing gestures through image recognition, a proximity sensor including an illumination sensor or an infrared sensor for sensing user access, a motion sensor for recognizing a user's actions through an acceleration sensor or a gyro sensor, and various types of input means capable of sensing or receiving various types of user input. Here, the touch sensor may be implemented as a touch panel attached to a display panel or a piezoelectric or capacitive touch sensor for sensing a touch through a touch film, an optical touch sensor for sensing a touch by an optical method, or the like. In addition, the input module may be implemented in the form of an input interface (USB port, PS/2 port, etc.) for connecting an external input device receiving a user input, instead of a device for sensing the user input. Additionally, the output module may output various types of information to a user. The output module may include a display for outputting images, a speaker for outputting sound (and/or an amplifier connected thereto), a haptic device for generating vibrations, and other various types of output means. In addition, the output module may be implemented in the form of a port type output interface for connecting the individual output means described above.

The display module 640 is connected to the processor 610 and displays various information. The display module is included in the input/output module or located outside the input/output module. Referring to FIG. 5, it is illustrated that the display module is located outside the input/output module, but the configuration is not limited thereto.

For example, the display module 640 displays texts, still images, or moving images. The display means a broad sense image display device including a liquid crystal display (LCD), a light emitting diode (LED) display, an organic light emitting diode (OLED) display, a flat panel display (FPD), a transparent display, a curved display, a flexible display, a 3D display, a holographic display, a projector, and various types of devices capable of performing image output functions. Such a display may be in the form of a touch display integrally configured with the touch sensor of the input module.

The processor 610 controls the overall operation of the apparatus (device). The processor 610 computes and processes various information and controls operations of the components of the first device and/or the second device. The processor 610 may be implemented as a computer or a similar device according to hardware, software or a combination thereof. In hardware, the processor 610 is provided in the form of an electronic circuit for processing an electrical signal to perform a control function. In software, the processor 610 may be provided in the form of a program for driving the hardware processor 240. Meanwhile, in the following description, unless otherwise specified, it is interpreted that the operations of the first device and/or the second device are performed under the control of the processor 610.

In summary, the present disclosure can be implemented through various means. For example, various embodiments may be implemented by hardware, firmware, software, or a combination thereof.

In the case of implementation by hardware, the method according to the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementation by firmware or software, the method according to the present disclosure may be implemented in the form of a module, procedure, or function for performing the functions or operations described below. For example, software codes are stored in the memory and driven by the processor. The memory (database) is located inside or outside the processor, and exchange data with the processor by various known means. The method or algorithm described in relation to the embodiments of the present disclosure can be directly embodied in hardware, can be embodied in a software module executed by hardware, or can be embodied by combination thereof. The software module can reside in a random access memory (RAM), a read-only memory (ROM), an erasable programmable read-only memory (EPROM), an electrically erasable programmable read-only memory (EEPROM), a flash memory, a hard disk, a detachable disk, a CD-ROM, or a medium readable by a computer, well-known in the technical field to which the present disclosure belongs.

According to the present disclosure, the database 620 stores contents for a cloud change history. Before cloud changes are applied to the infrastructure, the processor 610 provides the manager with the infrastructure changes visualized in advance through the display module 640 and the input/output module 630.

According to the present disclosure, the user interface module 650 is connected to the processor 610 and includes a combination of well-known user interfaces, such as a keypad, a touch screen, and the like.

In more detail, the present disclosure includes the database 620 configured to store data, one or more processors 610 connected to the database, and the display module 640.

The processor 610 may change the assets requested by the development team or the management team using the infrastructure as code (IaC).

The processor 610 may hook and hold the changes of the changed assets and collect cloud infrastructure information from the cloud environment through an application programming interface (API). In a case in which it is impossible to hook the changes, the processor 610 distributes the changed resources without holding the changes.

The display module 640 visualizes the collected cloud infrastructure information, and visualizes the changes of the changed assets.

Here, the asset changes may include any one among the contents related to an infrastructure change, an account change, and a firewall change.

The display module 640 visually displays the asset changes in the form of still images or moving images, such as a graph, a diagram, and a flow chart.

The processor 610 reports the visualized cloud infrastructure information and the visualized asset changes to the manager through the authorization process to output the same to the manager through the input/output module.

The authorization process includes a plurality of operations, and the processor 610 progresses the authorization process while going through approval of persons in charge of the corresponding operations.

In a case in which the changes are returned in any one among the plurality of operations, the process does not progress to the next operation, In this case, the processor 610 transmits the information about the returned operation and the information about the returned asset changes to the person who requested the corresponding change.

In the authorization process, the manager may determine a return or an approval of the asset changes, and input it to the device through the input/output module 630.

In a case in which the manager approves the asset changes in the authorization process, the processor 610 may apply the holding changes to the cloud environment. In a case in which the changes were reflected in advance, the changes reflected to the cloud is maintained.

In the authorization process, in a case in which the manager returns the asset changes, the processor 610 does not apply the holding changes to the cloud environment. Additionally, the processor 610 transmits the reason of the return to the person who requested the changes. In a case in which the changes were reflected in advance, the prior-reflected changes must be cancelled since the asset changes were returned. Therefore, the processor 610 changes the cloud policies and the reflected matters into the state before the reflection. The processor 610 outputs the changed contents into visualized contents again.

The database 620 stores information about assets requested by the development team or the management team and information on the authorization process.

The processor 610 performs machine learning the asset changes requested by the development team or the management team, and constructs an algorithm calculating the cases in which the changes are approved or returned in the process.

As described above, the present disclosure monitors and visualizes requests for generation, change, and deletion of cloud resources in advance before the requests are reflected to the cloud, so that the security team and the infrastructure team can easily review the infrastructure.

Furthermore, the present disclosure hooks the infrastructure changes requested by the development team or the management team to hold the actual reflection, thereby increasing agility of the cloud environment by preventing the changes from being reflected after approval.

Additionally, the present disclosure goes through the authorization process by each person in charge before distribution of the infrastructure, so as to change and manage the infrastructure without additional authorization process with respect to change and management of resources and firewalls.

In addition, the present disclosure provides the automated authorization (approval/return) management system for the cloud change history, thereby promoting the convenience of the manager.

The method or algorithm described in relation to the embodiments of the present disclosure can be directly embodied in hardware, can be embodied in a software module executed by hardware, or can be embodied by combination thereof. The software module can reside in a random access memory (RAM), a read-only memory (ROM), an erasable programmable read-only memory (EPROM), an electrically erasable programmable read-only memory (EEPROM), a flash memory, a hard disk, a detachable disk, a CD-ROM, or a medium readable by a computer, well-known in the technical field to which the present disclosure belongs.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

The invention claimed is:

1. A method of authorizing a change in a cloud infrastructure performed by an apparatus, the method comprising:
   receiving a first request for first asset changes and a second request for second asset changes, from a development team or a management team, using infrastructure as code (IaC) of an application programming interface (API) software development kit (SDK), wherein the first asset changes and the second asset changes comprise infrastructure changes, account changes, and firewall changes;
   executing the first request as being unavailable for hooking and holding of the asset changes, by performing:
      applying the asset changes to the cloud infrastructure without holding;
      visualizing the applied asset changes to the cloud infrastructure;
      reporting the visualized cloud infrastructure information and the visualized asset changes to the manager through an authorization process;
      modifying the changes applied to the cloud infrastructure; and
      visualizing the modified contents to the cloud infrastructure,
   executing the second request as being available for hooking and holding of the asset changes, by performing:
      collecting cloud infrastructure information from the cloud infrastructure through an API;
      visualizing the cloud infrastructure information;
      visualizing the asset changes by using at least one of a graph, a diagram, and a flow chart;
      reporting the visualized cloud infrastructure information and the visualized asset changes to a manager via an authorization process including a plurality of operations; and progressing the authorization process by receiving approvals from users who are in charge of the plurality of operations, wherein, while hooking and holding of the asset changes, the asset changes stand by distribution of resources before being reflected to the cloud infrastructure;

returning or approving the asset changes based on a result of the authorization process;

transmitting information about a returned operation, information about returned asset changes, and a reason of returning, to a user who requested the asset changes, without applying the asset changes which are hooked and held;

storing information of the assets changes and information of the authorization process, in a database, wherein the information of the asset changes includes information on how, when, and how the resources were changed;

applying the asset changes to the cloud infrastructure; and constructing an algorithm, which is calculating cases in which the asset changes are approved or returned in the authorization process by performing machine learning of the asset changes in the authorization process.

* * * * *